(12) United States Patent
Barber

(10) Patent No.: US 8,593,659 B2
(45) Date of Patent: Nov. 26, 2013

(54) SYSTEM AND METHOD FOR THIRD PARTY AUTHENTICATION OF WEB-BASED PRINT-ON-DEMAND REQUESTS

(75) Inventor: Daniel Barber, Tustin, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 240 days.

(21) Appl. No.: 13/170,799

(22) Filed: Jun. 28, 2011

(65) Prior Publication Data

US 2013/0003103 A1  Jan. 3, 2013

(51) Int. Cl.
*G06F 15/00* (2006.01)
(52) U.S. Cl.
USPC ........... 358/1.14; 713/155; 713/168; 713/169
(58) Field of Classification Search
None
See application file for complete search history.

(56) References Cited

U.S. PATENT DOCUMENTS

| | | | |
|---|---|---|---|
| 2010/0161966 A1* | 6/2010 | Kwon et al. | 713/155 |
| 2010/0174626 A1* | 7/2010 | Stringfellow et al. | 705/30 |
| 2011/0004830 A1* | 1/2011 | Von Kaenel et al. | 715/751 |
| 2011/0047378 A1* | 2/2011 | Chen | 713/168 |
| 2011/0078438 A1* | 3/2011 | Tie et al. | 713/155 |
| 2011/0093940 A1* | 4/2011 | Dal Canto et al. | 726/7 |

* cited by examiner

*Primary Examiner* — Twyler Haskins
*Assistant Examiner* — Helen Q Zong
(74) *Attorney, Agent, or Firm* — Chen Yoshinmura LLP

(57) ABSTRACT

A system and program implement a process for allowing users of third party vendors to access print shop applications without separate authentication. The process includes the steps of creating a query-string having identification information of a third party vendor and authentication information of a user of the third party vendor. The query-string is created in response to the user's access to the third party vendor's web-site, and is contained in an inline frame and encrypted. Upon receiving the encrypted query-string sent from a third party vendor server to a print shop server, the query-string is decrypted. It is then determined whether the user has an existing account on the print shop server. If the user has an existing account, the user is automatically logged into the print shop server so that the user may access and use any print-on-demand applications on the print shop server without manually inputting user authentication information on the print shop server.

23 Claims, 5 Drawing Sheets

SYSTEM AND METHOD FOR THIRD PARTY AUTHENTICATION OF WEB-BASED PRINT-ON-DEMAND REQUESTS

BACKGROUND OF THE INVENTION

1. Field of the Invention

This invention relates generally to print shop management system and methods, and more particularly it relates to web-based print shop servers and programs for authenticating print-on-demand users from third party vendors.

2. Description of Related Art

With the development of modern computer and communication technologies and printing industry, many print jobs from individual customers can be handled by print shops via submission through a computer network system such as the Internet. One example is a student of a school who has a print job that needs to be printed. The student may log on to the school's server from his or her own laptop via the Internet or from a school computer terminal via an Intranet system of the school. The student submits his or her print job request to the school's server. The print job can then be handled by the school's internal printing department or an outside vendor such as a print shop.

From a print shop operator's point of view, such print job request is coming from a "third party", which is the school. A print shop generally is a professional printing establishment having multiple sophisticated printers and finishing equipment that can handle a variety of print jobs. A print shop typically has at least one print server to handle the intake and processing of print jobs and control the operation of the printers and finishing equipment. The print server can communicate with a third party's server via the Internet to handle web-based print-on-demand (POD) requests.

However, when receiving a web-based POD request of a user from a third party vendor such as a school, there is a need to authenticate the user by the print shop's system without any direct interaction with the user. For example, when the user is a student of the school, the school's server already has the user's information and can authenticate the user. When the user submits a POD request to the school's server which in turn passes it to the print shop to handle the print job, it is desirable that the print shop server can authenticate the user based on the authentication by the school's server, without requiring the user to go through the authentication process again with the print shop server.

Therefore, there is a need to provide a print shop management method and program for authenticating users from third party sources without directly interacting with the users but rather based on the users' existing authentication with the third party sources.

SUMMARY

The present invention is directed to a method of seamlessly transitioning a third party users from another web-site to the print shop's own server, all the while handling user accounts, registration, and any other necessities transparently.

An object of the present invention is to provide a method that allows users from third party vendors to use a print shop service without re-registration or authentication, while protecting such users' personal and private information.

Another object of the present invention is to allow the print shop system and program to be integrated with other web-based service provider systems and programs easily while maintain the strict security of the print shops' own systems.

To achieve these and/or other objects, as embodied and broadly described, the present invention provides a method for allowing users of third party vendors to access print shop applications without separate authentication. The present invention method includes the steps of creating a query-string having identification information of a third party vendor and authentication information of a user of the third party vendor. The query-string is created in response to the user's access to the third party vendor's web-site, and is also contained in an inline frame and encrypted. Upon receiving the encrypted query-string sent from a server of the third party vendor to a print shop server, the query-string is decrypted. It is then determined whether the user has an existing account on the print shop server on the basis of the decrypted authentication information of the user. If the user has an existing account, the user is automatically logged into the print shop server so that the user may access and use any print-on-demand applications on the print shop server without manually inputting user authentication information on the print shop server.

In another preferred embodiment, the present invention includes a system for allowing users of third party vendors to access print-on-demand applications without separate authentication. The system includes at least one data processing apparatus having a non-transitory memory storing a computer software program and a processor executing the computer software program, wherein the computer software program includes program code configured to cause the at least one data processing apparatus to execute the present invention process.

In still another preferred embodiment, the present invention includes a computer software program product having a computer readable program code embedded in a computer usable non-transitory storage medium for controlling at least one data processing apparatus, where the computer readable program code is configured to cause at least one data processing apparatus to execute the process implementing the present invention method.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for authenticating users of print-on-demand (POD) services of a third party vendor based on the POD users' existing authentication with the third party vendor without directly interacting with the users. The present invention method may be implemented by a computer software program that has program codes and instructions for implementing the steps of the present invention.

Figure 1:
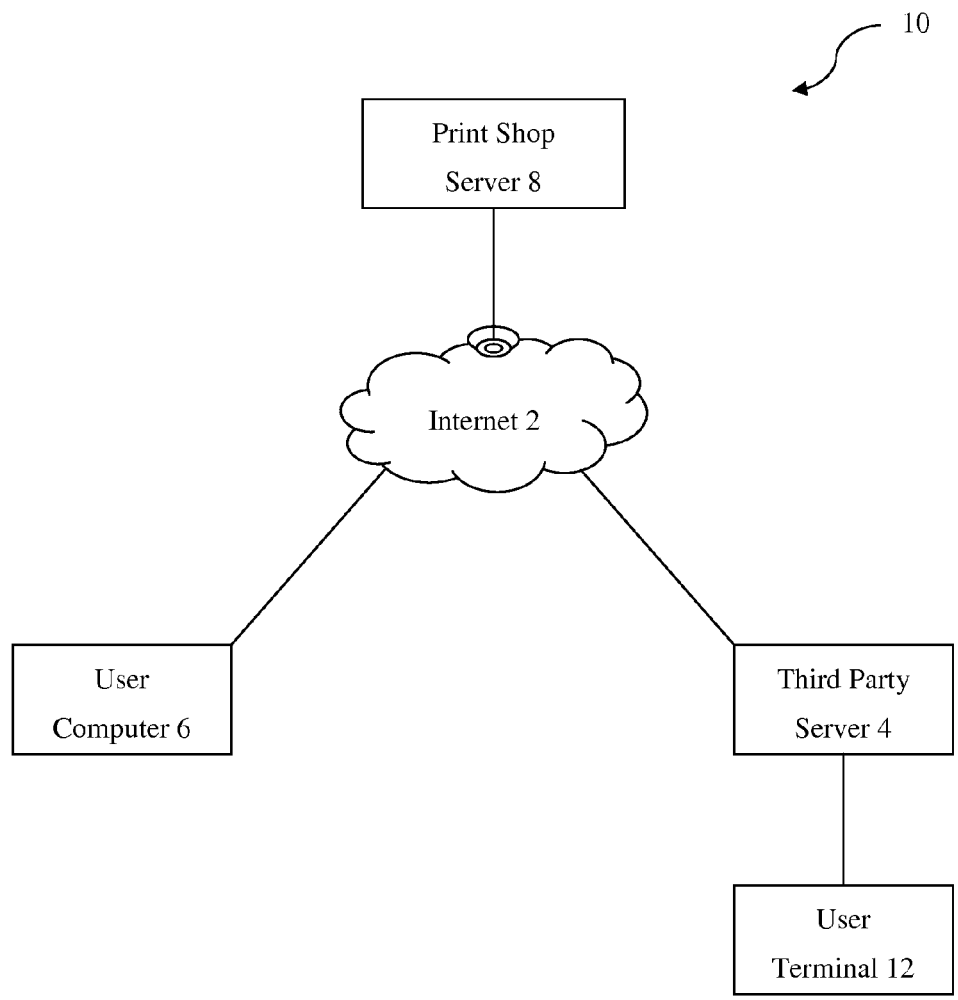
FIG. 1 is a schematic block diagram illustrating an arrangement for a print shop server to receive a user's print-on-demand (POD) request through a third party vendor via the Internet according to an embodiment of the present invention.

Referring to FIG. 1, there is shown at 10 a schematic block diagram illustrating an arrangement for a print shop server to receive a user's print-on-demand (POD) request through a third party vendor via the Internet according to an embodiment of the present invention. The present invention set up or arrangement 10 includes a print shop server 8 connected to an open computer network such as the Internet 2 for handling web-based print-on-demand (POD) job requests from a third party vendor which also has a server 4 connected to the Internet 2. A user may submit a POD request to the third party vendor's server 4 either from the user's own computer 6 via the Internet 2 or at a terminal 12 of the third party vendor's server 4. The third party server 4 then forwards the POD request to the print shop server 8 via the Internet 2 without the need for any direct interaction between the user and the print shop. This arrangement is particularly desirable when the user is a member of the third party vendor, such as a student (i.e., the user) of a school (i.e., the third party vendor) who is familiar with the school's computer system but not necessarily familiar with outside web-based print service providers (e.g. the print shop). Under this arrangement where the student's POD request is submitted to the school's server 4 and then forwarded to the print shop server 8, the student is dealing with his or her school, not an outside service provider. Therefore, the computer program implementing the present invention process does not need to be installed on the student's computer 6; rather, it only needs to be installed and executed on the school's server 4 and the print shop's server 8 for forwarding the student's POD request submitted to the school's server 4 to the print shop's server 8 so that the POD request can be handled and processed by the print shop server 8.

Figure 2:
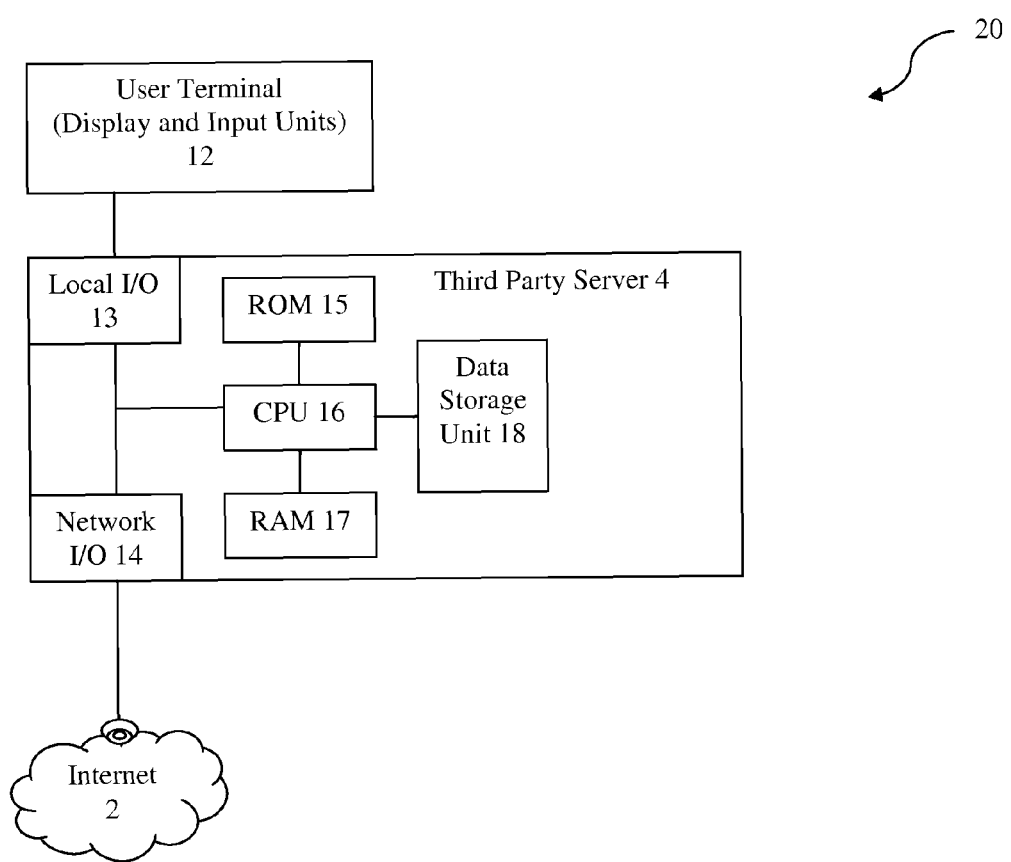
FIG. 2 is a schematic block diagram illustrating an exemplary third party server for forwarding a user's POD request to a print shop server according to an embodiment of the present invention.

Referring to FIG. 2, there is shown at 20 a schematic block diagram illustrating an exemplary third party server 4 for forwarding a user's POD request to a print shop server 8 according to an embodiment of the present invention. The third party server 4 typically includes a central processor unit (CPU) 16 that controls the function and operation of the server 4 and execute computer instructions and programs that may be installed or saved on a read only memory (ROM) 15, a random access memory (RAM) 17, or a data storage unit 18 (such as a hard disc drive or a flash memory) coupled to the CPU 16. One or more user terminals 12 (each may have its display and input units) may be connected to the server 4 to enable a user to interact with the server 4. In addition the server 4 may have its own integrated display and input units (not shown) to enable an operator to interact with and control the server 4. The server 4 typically also has a local input/output (I/O) port 13 for connection with the user terminal 12, and a network I/O port 14 for connection to a network such as the Internet 2 so that the server 4 may remotely communicate with the user computer 6 and the print shop servers 8 via the Internet 2. It is understood that third party server 4 may be any suitable computer or any suitable data processing apparatus.

Figure 3:
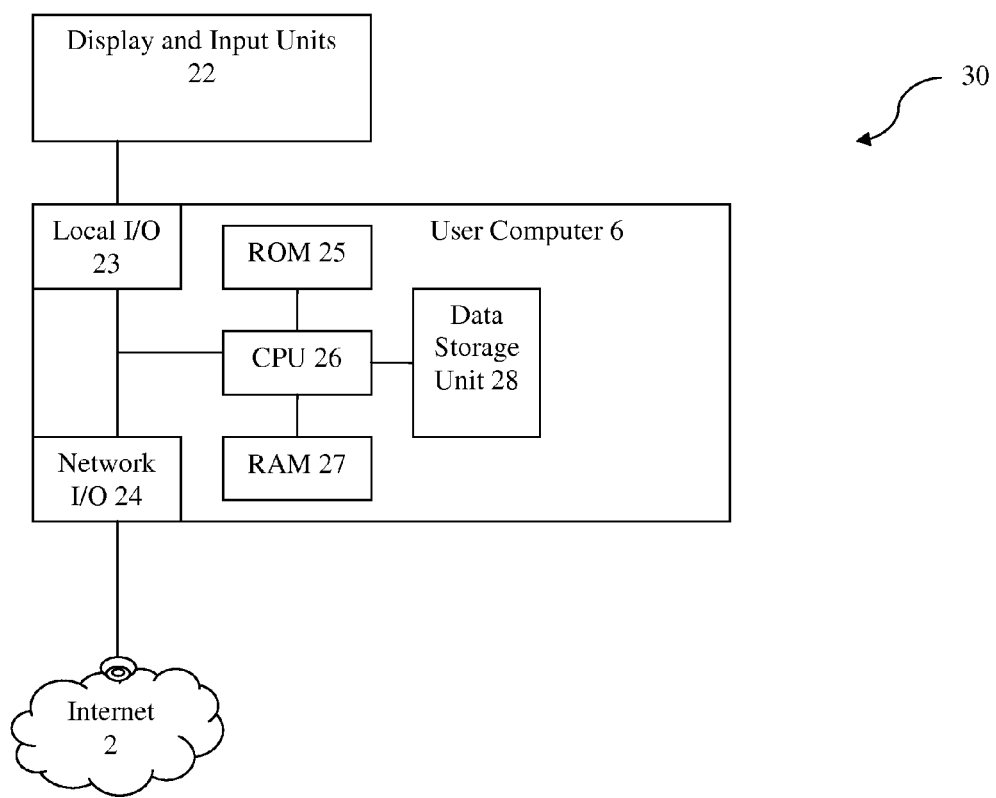
FIG. 3 is a schematic block diagram illustrating an exemplary user computer system for submitting a POD request to a print shop server through a third party vendor via the Internet according to an embodiment of the present invention.

Referring to FIG. 3, there is shown at 30 a schematic block diagram illustrating an exemplary user computer system 6 for submitting a POD request to a print shop server 8 through a third party vendor serer 4 via the Internet 2 according to an embodiment of the present invention. The user computer 6 typically includes a central processor unit (CPU) 26 that controls the function and operation of the user computer 6 and execute computer instructions and programs that may be installed or saved on a ROM 25, a RAM 27, or a data storage unit 28 (such as a hard disc drive or a flash memory) coupled to the CPU 26. The user computer 6 has external and/or integrated display and input units 22) to enable a user to interact with the user computer 6. The computer 6 also has a local I/O port 23 for connection with display and external input units 22, and a network I/O port 24 for connection to a network such as the Internet 2 so that the user computer 6 may remotely communicate with the third party server 4 via the Internet 2. It is understood that user computer 6 may be any suitable computer, such as a desktop computer, a laptop computer, a server, a notebook computer, a netbook computer, a tablet computer such as iPad®, or any suitable data processing apparatus including but not limited to smart-phones such as iPhone®, iPod Touch® and other handheld devices that have suitable data processing capabilities.

Figure 4:
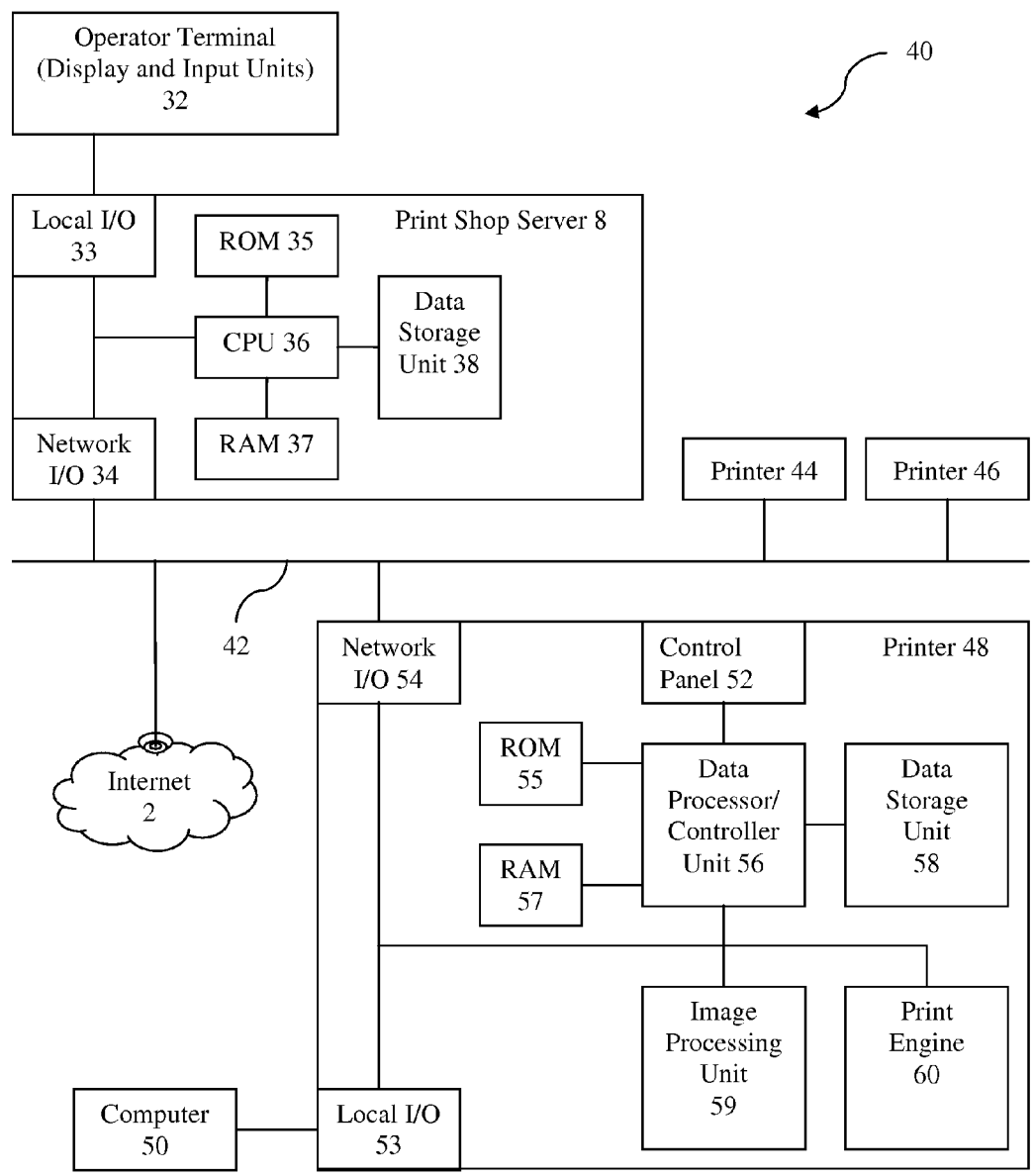
FIG. 4 is a schematic block diagram illustrating an exemplary print shop server and printers for handing a user's POD request received from a third party vendor via the Internet according to an embodiment of the present invention.

Referring to FIG. 4, there is shown at 40 a schematic block diagram illustrating an exemplary print shop system set up or arrangement, whereupon various embodiments of the present invention may be implemented. In this patent application the term "print shop" refers to an environment of professional print shops or publishing workshops, where a variety of print jobs including POD requests can be handled by utilizing one or more printers including black and white and/or color printers and finishing equipment.

In the exemplary print shop printing system set up or arrangement 40, a multiplicity of color and/or black and white printers 44, 46 and 48 are connected to and controlled by at least one printer shop server 8 through a data communication channel 42 which may be a wired or wireless network, a serial bus or a dedicated cable, etc. One or more of the printers, such as printer 48, may also be directly connected to and controlled by a local computer 50. Other devices (not shown) may also be connected to the print shop server 8, the local computer 50 or network channel 42, such as scanners, facsimile machines, finishing equipment, etc., as part of the printing system set up or arrangement 40. The print shop system 40 may also include a number of "off-line" (or "off-network") devices (not shown) that are not connected to the network channel 42, which devices may be any type of devices used in the print shop, such as additional finishing devices, prepress devices, etc.

In this application the term "printer" may refer to small desk-top printers typically seen in an office environment, or large digital printing systems used in professional print shops. The term may also cover other similar image and document processing devices such as copiers or multifunction ("all-in-one") printers that also have copier, scanner and/or facsimile functions. The printer may be directly attached to a computer or server locally, or connected to a computer or server through a network remotely, where the computer or server are used to manage a print job to be processed by the printer. The printer may have multiple paper trays to store paper of various sizes, color, and types. Further, the printer may be equipped with a sophisticated output sorting mechanism with multiple output trays to perform collate printing or other print finishing functions.

As shown in FIG. 4, the print shop server 8 typically includes a central processor unit (CPU) 36 that controls the function and operation of the server 8 and execute computer instructions and programs that may be installed or saved on a ROM 35, a RAM 37, or a data storage unit 38 (such as a hard disc drive) coupled to the CPU 36. One or more print shop operator terminals 32 (each may have its display and input units) may be connected to the print shop server 8 to enable print shop operators to interact with the print shop server 8 and/or the rest of the print shop system 40. Alternatively the print shop server 8 may have its own integrated display and input units to enable print shop operators to interact with the print shop server 8 and/or the rest of the print shop system 40. The print shop server 8 typically has a local I/O port 33 for connection with the operator terminal 32, and a network I/O port 34 for connection to the data communication channel 42. Through the network channel 42 the print shop server 8 is also connected to the external computer network such as the Internet 2 so that the print shop server 8 can remotely communicate with the third party server 4 via the Internet 2. It is understood that print shop server 8 may be any suitable computer or any suitable data processing apparatus.

As also shown in FIG. 4, the printer 48 typically has a control panel 52, a controller or control unit 56 which controls the other internal units of printer 48 and is connected to the control panel 52, ROM 55, RAM 57 and a data storage unit 58. The control panel 52 is accessible by an operator and may include a display screen such as a liquid crystal display (LCD) display screen and user input means such as keys, buttons, touch screen, etc., for the operator to communicate with and control the function and operation of printer 48. The printer 48 also has an image processing unit 59 and a print engine 60. The printer 48 typically has a network I/O port 54 for connection with the print shop server 8, and a local I/O port 53 for optionally connecting to the local computer 50.

It is understood that while FIG. 4 shows a print shop environment, the present invention is not limited to any physical setting of a print shop or network, and can be applied to a printing system having a distributed setting where printers at different locations are connected to one print shop server. In particular, it should be apparent that one or more of the components of the printing system can communicate with the rest of the system via virtual private network (VPN) or similar means through the Internet.

The present invention third party user authentication method and process is implemented in a computer application program that has two modules, one installed on the third party server 4 and the other installed on the print shop server 8. The third party server module is executed after a user logs on to the third party server 4 and authenticated by the third party server 8 for submitting a POD request, to send an encrypted query-string to the print shop server 8. The print shop server module is executed to receive and decrypt the query-string with the third party user authentication information and then pass the POD request to the POD application for printing.

The present invention provides a streamlined process for authenticating a user of a third party vendor who submits a POD request through the third party server 4. The third party vendor-end module of the computer software program that implements one preferred mode of the present invention method and process may be installed on the third party server 4, and its print shop end modules may be installed on the printer shop servers 8 (or on the printer 48 or local computer 50). When a user of the third party vendor logs on to the third party vendor server 4 and submits a POD request that will be handled by the print shop, the third party vendor-end module of the software program of the present invention will be executed to carry out various respective functions of the software to perform the third party server part of the exemplary process of the present invention. When the print shop server 8 receives the authentication information of the user of the third party vendor from the third party vendor's server 4, the print shop server-end of the module of the exemplified software program of the present invention will be executed to carry out various respective functions of the software to perform the print shop part of the exemplary process of the present invention. Together the execution of the various application modules of the exemplary software program of the present invention by the third party vendor server 4 and the printer shop server 8 causes the performance and completion of the exemplary method and process of the present invention described below.

Figure 5:
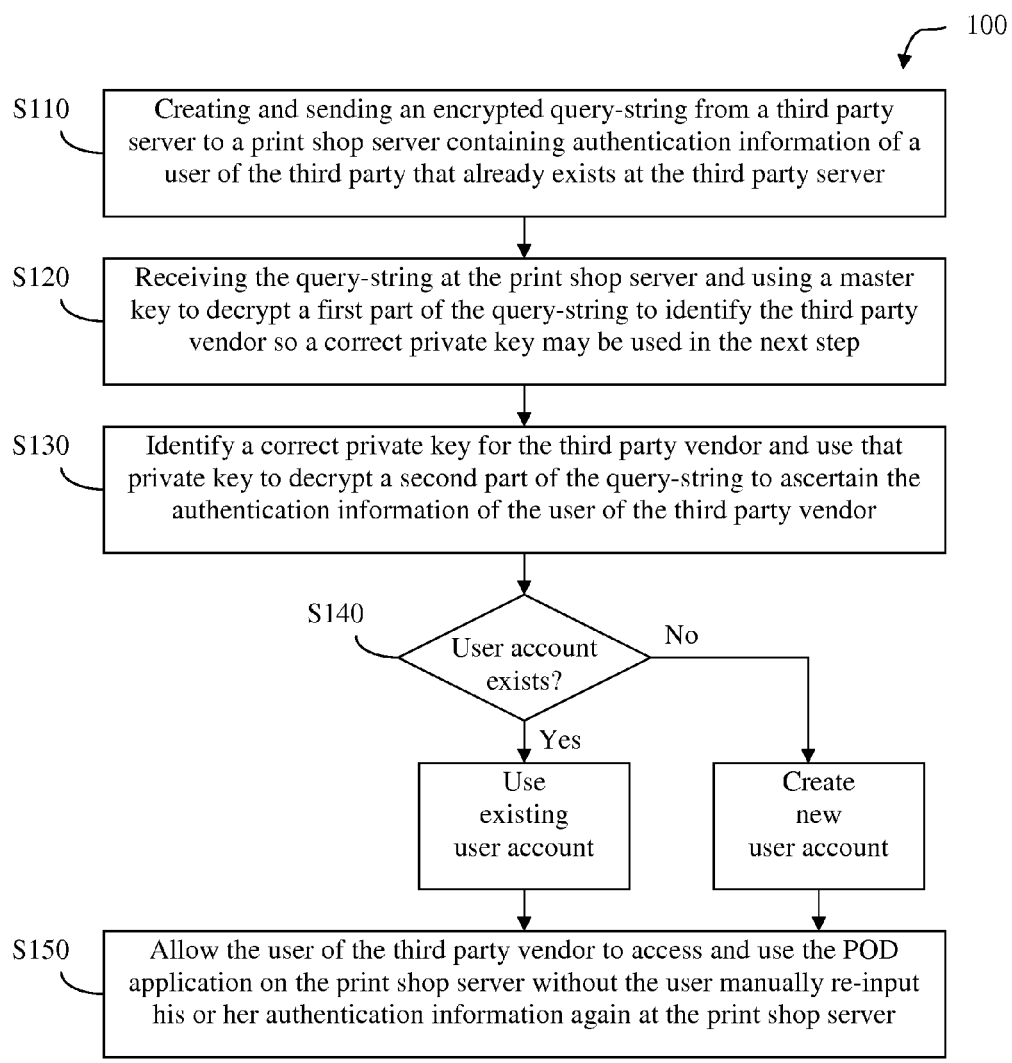
FIG. 5 is a flow chart showing an exemplary process implementing a method for authenticating POD users of a third party vendor based on existing authentication of the users with the third party vendor according to an embodiment of the present invention.

Referring to FIG. 5, there is shown at 100 a flow chart showing an exemplary process implementing a method for authenticating POD users of a third party vendor based on existing authentication of the users with the third party vendor according to an embodiment of the present invention.

To implement the authentication process, the print shop server module first detect an incoming POD request from a user via a third party vendor server, register the user (if necessary), and log the user into the print shop's POD application, all with no interaction from the user. In order to do so, it is necessary to first provide a process to create a security and encryption procedure that will make sure that the POD request comes from a trusted third party vendor site and also ensure the security of the print shop server and POD applications.

Because the print shop POD application is not on the same domain as the third party's web-site portal or applications, it is necessary to provide a procedure for the third party server to quickly send the third party user to the print shop server's web-site, authenticate the user, and redirect the user to the web-page of the POD application the user has requested. This procedure will be done via an encrypted query-string in an inline frame or "iframe" format containing a uniform resource locator (URL). The use of iframe is chosen because its address (including the query-string) is accessible by certain POD application domains and print shop servers without any cross-site-scripting hacks. The iframe would be placed on the first post-login screen a user sees on a third party server web-site, so that any subsequent requests to our the print shop POD application would be pre-authenticated.

Therefore, the first step S110 of the present invention process 100, as shown in FIG. 5, is to create an encrypted iframe query-string at the third party server end. An advanced POD application would have security features for managing access of the POD application, including managing authentication information such as user names, their email addresses, log-in IDs, passwords, etc. For a user that has already logged onto a third party server or web-site, the third party server already has the user's authentication information, and it is preferable not to ask the user to input or provide his or her authentication information again when the user submits a POD request to the print shop through the third party server. To avoid the procedure to have the user to input or provide his or her authentication information again, the third party server module of the present invention program will first send a query-string that contains the user's existing authentication information from the third party vendors' server.

To reduce the security risk with this type of authentication model that uses an iframe containing query-string data in the POD request which may be read by others, the iframe query-string needs to be encrypted to protect the privacy of the users of the third party vendor. A two-part encryption scheme is utilized. First, the iframe query-string is encrypted in two parts (or encrypted to contain two parameters) X and Y, with values that would appear to be junk data. The first part X is an identifier of the incoming web-site so that the print shop server can differentiate the third party vendors in its system. Accordingly the first part X is encrypted by a master key that is shared between all third party vendors (which for security reasons may be changed at set time intervals). The second part Y is the data that contains the authentication information of a user of a particular third party vendor, which for example may have a format as follows:

?firstname=phil&lastname=asao&email=phil.asao@pg.com&password-password1

The second part Y is encrypted with a private key that is only applicable for a particular third party vendor. As dictated by security for each third party vendor, its respective private key may be changed on a schedule as required by the third party vendor.

At step S120 as shown in FIG. 5, when the print shop server 8 receives the encrypted iframe query-string containing both the X and Y parts, part X is decoded first by using the shared master key to identify a particular third party vendor from which the query-string is received. At step S130 then, the print shop server program module retrieve the correct private key for the particular third party vendor based on the identification obtained from decrypting part X of the encrypted query-string. Once part Y of the query-string is decrypted, the print shop server 8 possesses the authentication information of the user of the third party vendor.

At the next step S140 as shown in FIG. 5, after the print shop server 8 ascertains the authentication information of the third party vendor by completely decrypting the query-string received from the third party vendor server 4, the print shop server module of the present invention program proceed to determine if this user already exists. For example, email may be used as a delimiter on the users. If the user has previously used the POD application on the print shop server 8 and therefore has an existing user account, the user will be automatically registered by and logged-in to the print shop server 8. If the user has no existing account on the print shop server 8, then a new user account will be automatically created with the ascertained user authentication information, and the user will be registered by and logged into the printer server 8. In either case there is no need for the user of a third party vendor to re-input or re-enter his or her authentication information manually again at the print shop server 8.

At step S150 as shown in FIG. 5, once the user is authenticated by (and registered and logged in) the print shop server 8, the user is re-directed to the POD application web-pages shown on the print shop server's webs-site so that the user may submit his or her PDO job to be handled by the print shop system. In addition, a cookie may be created using the print shop server's iframe tag on the user's computer 6. This will allow the third party vendor server 4 to direct this user to the print shop server 8 when the user logs into the third party vendor's server 4 for submitting a POD request. Since the user has already been registered, the user can log in to the print shop server without any additional manual authentication process, and is ready to utilize the functionalities of the print shop server 8 as the user wishes. The user is also free to browse the print shop server's web-site as normal and can click the "back" button of the browser to go back to the third party vender server's web-site or portal.

The above described exemplary system, method and process of the preferred embodiments of the present invention has many advantages. It allows a print shop server application to more quickly and cost-effectively integrate its existing POD services and products and provide them to the users of third party vendors without creating an unacceptable or troublesome experience to the users of third party vendor. Meanwhile, the print shop can maintain its tight control over access to its POD services and products, protect user privacy, and allow its POD services and products to be accessible to more than just the print shop own users.

It will be apparent to those skilled in the art that various modification and variations can be made to the methods of the present invention without departing from the spirit or scope of the invention. Thus, it is intended that the present invention cover modifications and variations that come within the scope of the appended claims and their equivalents.

What is claimed is:

1. A method for allowing users of third party vendors to access print shop applications without separate authentication, comprising the steps of:
   a. a third party vendor server, in response to a user's access to a third party vendor's server or web-site, creating a query-string including a first part containing identification information of the third party vendor encrypted with a master key shared by all third party vendors and a second part containing authentication information of the user of the third party vendor encrypted with a private key assigned only to the third party vendor, the query-string being contained in an inline frame;
   b. a print shop server, upon receiving the encrypted query-string sent from a server of the third party vendor server to the print shop server, decrypting the first part of the query-string with the masker key to ascertain the identification information of the third party vendor;
   c. the print shop server, based on identification of the third party vendor obtained from decrypting the first part of the query-string, identifying the private key assigned to the third party vendor, and retrieving the private key assigned to the third party vendor;
   d. the print shop server decrypting the second part of the query-string with the private key assigned to the third party vendor to ascertain the authentication information of the user of the third party vendor;
   e. the print shop server, based on identification of the user obtained from decrypting the second part of the query-string, determining whether the user has an existing account on the print shop server; and
   f. the print shop server automatically logging the user into the print shop server after it is determined that the user has an existing account so that the user may access and use any print-on-demand applications on the print shop server without manually inputting user authentication information on the print shop server.

2. The method according to claim 1, further comprising a step of creating an account for the user on the print shop server with the authentication information of the user if it is determined in step "e" that the user does not have an existing account on the print shop server.

3. The method according to claim 2, further comprising a step of automatically logging the user into the print shop server after the user has a newly created account so that the user may access and use any print-on-demand applications on the print shop server without manually inputting user authentication information on the print shop server.

4. The method according to claim 1, further comprising a step of receiving a print-on-demand request from a user of a third party vendor at the third party vendor server.

5. The method according to claim 1, further comprising a step of sharing the master key with a multiplicity of third party vendors.

6. The method according to claim 1, further comprising a step of assigning a unique private key to each third party vendor.

7. The method according to claim 1, wherein the inline frame contains a uniform resource locator (URL).

8. A system for allowing users of third party vendors to access print-on-demand applications without separate authentication comprising at least one data processing apparatus having a non-transitory memory storing a computer software program and a processor executing the computer software program, wherein the computer software program includes program code configured to cause the at least one data processing apparatus to execute a process which comprises the steps of:
   a. a third party vendor server, in response to a user's access to a third party vendor's server or web-site, creating a query-string including a first part containing identification information of the third party vendor encrypted with a master key shared by all third party vendors and a second part containing authentication information of the user of the third party vendor encrypted with a private key assigned only to the third party vendor, the query-string being contained in an inline frame;
   b. a print shop server, upon receiving the encrypted query-string sent from the third party vendor server to the print shop server, decrypting the first part of the query-string with the master key to ascertain the identification information of the third party vendor;
   c. the print shop server, based on identification of the third party vendor obtained from decrypting the first part of the query-string, identifying the private key assigned to the third party vendor, and retrieving the private key assigned to the third party vendor;
   d. the print shop server decrypting the second part of the query-string with the private key assigned to the third party vendor to ascertain the authentication information of the user of the third party vendor;
   e. the print shop server, based on identification of the user obtained from decrypting the second part of the query-string, determining whether the user has an existing account on the print shop server; and
   f. the print shop server automatically logging the user into the print shop server after it is determined that the user has an existing account so that the user may access and use any print-on-demand applications on the print shop server without manually inputting user authentication information on the print shop server.

9. The system according to claim 8, wherein the process further comprises a step of creating an account for the user on the print shop server with the authentication information of the user if it is determined in step "e" that the user does not have an existing account on the print shop server.

10. The system according to claim 9, wherein the process further comprises a step of automatically logging the user into the print shop server after the user has a newly created account so that the user may access and use any print-on-demand applications on the print shop server without manually inputting user authentication information on the print shop server.

11. The system according to claim 8, wherein the process further comprises a step of receiving a print-on-demand request from a user of a third party vendor at the third party vendor server.

12. The system according to claim 8, wherein the process further comprises a step of sharing the master key with a multiplicity of third party vendors.

13. The system according to claim 8, wherein the process further comprises a step of assigning a unique private key to each third party vendor.

14. The system according to claim 8, wherein the inline frame contains a uniform resource locator (URL).

15. A computer software program product having a computer readable program code embedded in a computer usable non-transitory storage medium for controlling at least one data processing apparatus, the computer readable program code configured to cause the at least one data processing apparatus to execute a process which comprises the steps of:
   a. a third party server, in response to a user's access to a third party vendor's server or web-site, creating a query-string including a first part containing identification information of the third party vendor encrypted with a master key shared by all third party vendors and a second part containing authentication information of the user of the third party vendor encrypted with a private key assigned to the third party vendor, the query-string being contained in an inline frame;
   b. a print shop server, upon receiving the encrypted query-string sent from the third party vendor server to the print shop server, decrypting the first part of the query-string with the master key to ascertain the identification information of the third party vendor;
   c. the print shop server, based on identification of the third party vendor obtained from decrypting the first part of the query-string, identifying the private key assigned to the third party vendor, and retrieving the private key assigned to the third party vendor;
   d. the print shop server decrypting the second part of the query-string with the private key assigned to the third party vendor to ascertain the authentication information of the user of the third party vendor;
   e. the print shop server, based on identification of the user obtained from decrypting the second part of the query-string, determining whether the user has an existing account on the print shop server; and
   f. the print shop server automatically logging the user into the print shop server after it is determined that the user has an existing account so that the user may access and use any print-on-demand applications on the print shop server without manually inputting user authentication information on the print shop server.

16. The computer software program product according to claim 15, wherein the process further comprises a step of creating an account for the user on the print shop server with the authentication information of the user if it is determined in step "e" that the user does not have an existing account on the print shop server.

17. The computer software program product according to claim 16, wherein the process further comprises a step of automatically logging the user into the print shop server after the user has a newly created account so that the user may access and use any print-on-demand applications on the print shop server without manually inputting user authentication information on the print shop server.

18. The computer software program product according to claim 15, wherein the process further comprises a step of receiving a print-on-demand request from a user of a third party vendor at the third party vendor server.

19. The computer software program product according to claim 15, wherein the process further comprises a step of sharing the master key with a multiplicity of third party vendors.

20. The computer software program product according to claim 15, wherein the process further comprises a step of assigning a unique private key to each third party vendor.

21. The computer software program product according to claim 15, wherein the inline frame contains a uniform resource locator (URL).

22. The computer software program product according to claim 15, comprising a third party vendor module installed on a server of the third party vendor for executing step "a" of claim 15.

23. The computer software program product according to claim 22, further comprising a print shop module installed on a print shop server for executing steps "b" through "f" of claim 15.

* * * * *